United States Patent
Shiina

(10) Patent No.: US 10,279,836 B2
(45) Date of Patent: May 7, 2019

(54) STEERING SYSTEM

(71) Applicant: JTEKT CORPORATION, Osaka-shi, Osaka (JP)

(72) Inventor: Akihiko Shiina, Kashihara (JP)

(73) Assignee: JTEKT CORPORATION, Osaka-shi (JP)

(*) Notice: Subject to any disclaimer, the term of this patent is extended or adjusted under 35 U.S.C. 154(b) by 414 days.

(21) Appl. No.: 15/176,759

(22) Filed: Jun. 8, 2016

(65) Prior Publication Data

US 2016/0368529 A1 Dec. 22, 2016

(30) Foreign Application Priority Data

Jun. 16, 2015 (JP) ................................ 2015-121122

(51) Int. Cl.
*B62D 5/04* (2006.01)
*B62D 5/00* (2006.01)
(Continued)

(52) U.S. Cl.
CPC ............. *B62D 5/0454* (2013.01); *B62D 3/04* (2013.01); *B62D 5/003* (2013.01); *B62D 5/043* (2013.01);
(Continued)

(58) Field of Classification Search
CPC ........ B62D 5/0454; B62D 5/003; B62D 5/04; B62D 3/04; F16D 28/00; F16D 27/02; F16D 15/00
See application file for complete search history.

(56) References Cited

U.S. PATENT DOCUMENTS 7,726,439 B2* 6/2010 Akuta ...................... B62D 3/12
180/402
7,878,294 B2* 2/2011 Morikawa ............ B62D 5/0415
180/204
(Continued)

FOREIGN PATENT DOCUMENTS

DE 101 03 642 A1 8/2002
DE 102 07 913 A1 5/2003
(Continued)

OTHER PUBLICATIONS

Nov. 29, 2016 Extended Search Report issued in European Patent Application No. 16174381.0.
(Continued)

*Primary Examiner* — Joseph M Rocca
*Assistant Examiner* — Daniel S Yeagley
(74) *Attorney, Agent, or Firm* — Oliff PLC

(57) ABSTRACT

A steering system includes: a steering shaft to which a steering member is coupled; a worm wheel attached to the steering shaft so as to be rotatable integrally with the steering shaft; a housing that houses the worm wheel; an output shaft that is coaxial with the steering shaft and rotatable relative to the steering shaft and coupled to a steering operation mechanism; and a clutch mechanism that enables and disables transmission of power between the steering shaft and the output shaft. The clutch mechanism is housed and disposed in an internal space in the housing. A solenoid in the clutch mechanism is disposed on the opposite side of the worm wheel in an axial direction from a mechanical portion of the clutch mechanism.

13 Claims, 12 Drawing Sheets

(51) Int. Cl.
*B62D 3/04* (2006.01)
*B62D 5/24* (2006.01)
*F16D 11/00* (2006.01)
*F16D 13/00* (2006.01)

(52) U.S. Cl.
CPC ............ *B62D 5/0409* (2013.01); *B62D 5/24* (2013.01); *F16D 11/00* (2013.01); *F16D 13/00* (2013.01)

(56) References Cited

U.S. PATENT DOCUMENTS

| | | | |
|---|---|---|---|
| 9,109,642 B2* | 8/2015 | Kitayama | ............... F16D 28/00 |
| 9,279,462 B2* | 3/2016 | Kitayama | ............. F16D 41/088 |
| 9,399,484 B2* | 7/2016 | Katayama | ............. B62D 5/003 |
| 9,434,404 B2* | 9/2016 | Kuramochi | ............ B62D 5/003 |
| 2005/0205336 A1 | 9/2005 | Yamasaki et al. | |
| 2010/0314212 A1* | 12/2010 | Akiyoshi | ............. F16D 41/105 |
| | | | 192/66.1 |
| 2013/0161116 A1 | 6/2013 | Tashiro | |
| 2013/0299298 A1* | 11/2013 | Akiyoshi | ............. F16D 41/105 |
| | | | 192/71 |
| 2016/0297468 A1* | 10/2016 | Izutani | ................... B62D 5/003 |
| 2016/0368528 A1* | 12/2016 | Shiina | ...................... B62D 3/04 |

FOREIGN PATENT DOCUMENTS

| | | |
|---|---|---|
| EP | 1445171 A2 | 8/2004 |
| EP | 1985520 A1 | 10/2008 |
| JP | 2004-237785 A | 8/2004 |
| JP | 2005-081916 A | 3/2005 |
| JP | 4347100 B2 | 10/2009 |
| JP | 2010-221758 A | 10/2010 |
| JP | 4927608 B2 | 5/2012 |
| JP | 2012-106560 A | 6/2012 |
| JP | 2013092191 A * | 5/2013 |
| JP | 2013-132950 A | 7/2013 |
| WO | 87/06900 A1 | 11/1987 |

OTHER PUBLICATIONS

Mar. 14, 2019 Office Action issued in Japanese Patent Application No. 2015-121122.

* cited by examiner

CLUTCH IS ENGAGED (SOLENOID IS OFF)

STEERING SYSTEM

INCORPORATION BY REFERENCE

The disclosure of Japanese Patent Application No. 2015-121122 filed on Jun. 16, 2015 including the specification, drawings and abstract, is incorporated herein by reference in its entirety.

BACKGROUND OF THE INVENTION

1. Field of the Invention

The invention relates to a steering system.

2. Description of the Related Art

A steer-by-wire system has been proposed in which a steering member and a steering operation mechanism are not mechanically coupled together and in which a steering angle of a steering wheel is detected by an angle sensor so that a driving force exerted by a steering operation actuator controlled in accordance with a sensor output from the angle sensor is transmitted to the steering operation mechanism (see, for example, Japanese Patent Application Publication No. 2013-132950 (JP 2013-132950 A)). On the other hand, when the steer-by-wire system is mounted in a vehicle, an appropriate measure needs to be taken so that steered wheels can be steered even when the steering operation actuator or the like becomes defective.

Japanese Patent No. 4927608 and Japanese Patent No. 4347100 disclose, as a steering system for which the above-described measure has been taken, a configuration in which the steering member and the steering operation mechanism are coupled together via a clutch mechanism and in which the steering member and the steering operation mechanism are mechanically uncoupled from each other during a normal operation and are mechanically coupled together when an abnormality occurs.

When mounted in the steering system, a clutch mechanism may be, for example, interposed between an intermediate shaft and a steering column. However, in this case, the clutch mechanism may interfere with peripheral members. The steering system in which the clutch mechanism is mounted is desirably restrained from being increased in size.

SUMMARY OF THE INVENTION

An object of the invention is to provide a steering system in which a clutch mechanism can be mounted without interfering with peripheral members and which is restrained from being increased in size.

According to an aspect of the invention, a steering system includes: a steering shaft to which a steering member is coupled; a gear attached to the steering shaft so as to be rotatable integrally with the steering shaft; a housing that houses at least the gear; an output shaft that is rotatable relative to the steering shaft and coupled to a steering operation mechanism; and a clutch mechanism having a mechanical portion provided to enable the steering shaft and the output shaft to be coupled together and uncoupled from each other, and a driving force generating portion that generates a driving force allowing the mechanical portion to couple the steering shaft and the output shaft together and to uncouple the steering shaft and the output shaft from each other, the clutch mechanism enabling and disabling transmission of power between the steering shaft and the output shaft. The clutch mechanism is housed and disposed in an internal space in the housing. In the internal space, the diving force generating portion is disposed on the opposite side of the gear from the mechanical portion in an axial direction of the steering shaft.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
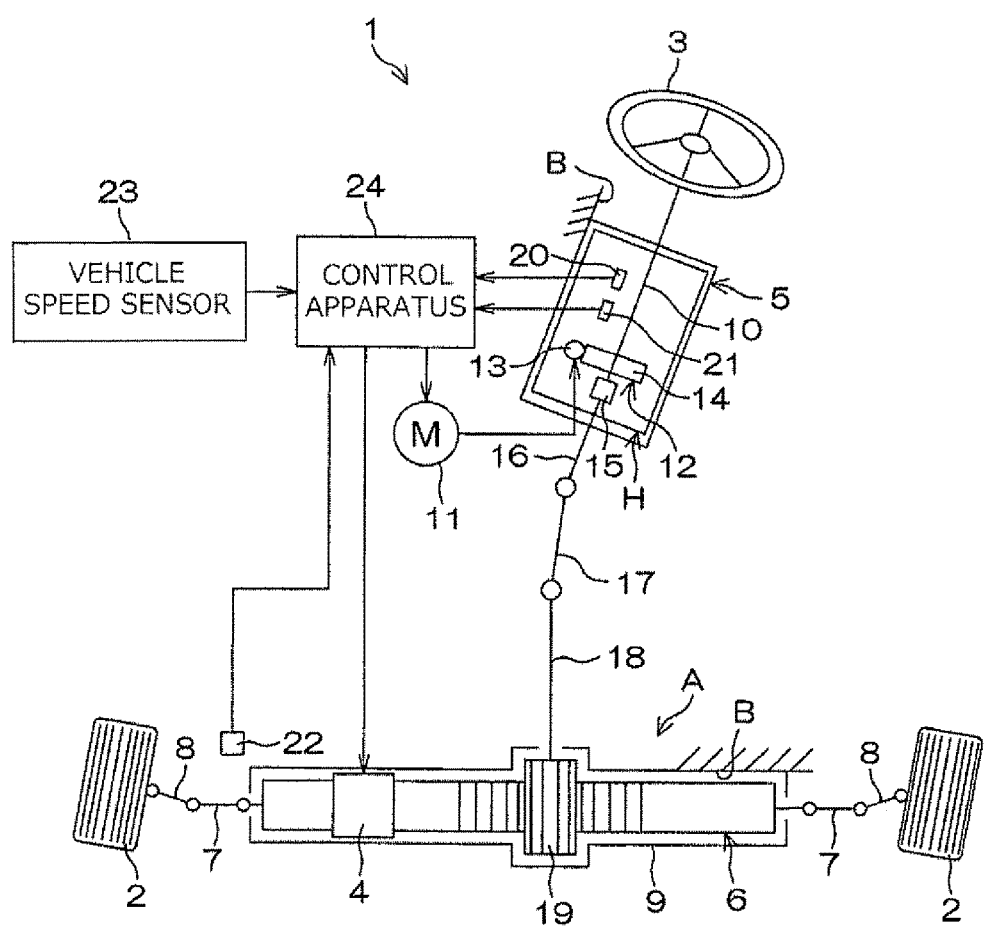
FIG. 1 is a diagram depicting a general configuration of a steering system according to an embodiment of the invention.

An embodiment of the invention will be described below in detail with reference to the attached drawings. FIG. 1 is a diagram depicting a general configuration of a steering system 1 according to an embodiment of the invention. The steering system 1 adopts what is called a steer-by-wire system in which a steering member 3 such as a steering wheel is mechanically uncoupled from a steering operation mechanism A allowing steering of steered wheels 2.

In the steering system 1, an operation of a steering operation actuator 4 is controlled according to a rotating operation of the steering member 3. The operation is converted into linear motion of a steered shaft 6 in a vehicle width direction. The linear motion of the steered shaft 6 is converted into a steering motion of the right and left steered wheels 2 to be steered, thereby turning of the vehicle is achieved. Specifically, the steering operation actuator 4 includes a motor. A driving force of the motor is converted into linear motion in the axial direction of the steered shaft 6 by a motion conversion mechanism (a ball screw apparatus or the like) provided in connection with the steered shaft 6. The linear motion of the steered shaft 6 is transmitted to tie rods 7 connected to respective opposite ends of the steered shaft 6 to cause respective knuckle arms 8 to pivot. Consequently, steering of the steered wheels 2 supported by the knuckle arms 8 is achieved. The steering operation mechanism A includes the steered shaft 6, the tie rods 7, and the knuckle arms 8. A steered shaft housing 9 that supports the steered shaft 6 is fixed to a vehicle body B.

The steering member 3 is coupled to a steering shaft 10. The steering shaft 10 is rotatably supported by a housing H of a steering column 5 fixed to the vehicle body B. The steering shaft 10 can rotate integrally with the steering member 3. To the steering shaft 10, a first motor 11 is attached, and a first speed reducer 12 is also attached which decelerates output rotation of the first motor 11. The first speed reducer 12 includes a worm shaft 13 rotationally driven by the first motor 11 and a worm wheel (gear) 14 that meshes with the worm shaft 13 and that is fixed to the steering shaft 10.

The steering shaft 10 is coupled to the steering operation mechanism A via the clutch mechanism 15. Specifically, the steered shaft 6 of the steering operation mechanism A includes a rack shaft. To a pinion shaft 18 having, at a distal end thereof, a pinion 19 that engages with the rack shaft, an output shaft 16 is connected via an intermediate shaft 17. The output shaft 16 is provided coaxially with the steering shaft 10 so as to be rotatable relative to the steering shaft 10. The clutch mechanism 15 is interposed between the steering shaft 10 and the output shaft 16.

In connection with the steering shaft 10, the steering system 1 is provided with a steering angle sensor 20 that detects a steering angle of the steering member 3. The steering shaft 10 is provided with a torque sensor 21 that detects a steering torque applied to the steering member 3. The torque sensor 21 is housed in the housing H of the steering column 5.

In connection with the steered wheels 2, the steering system 1 is provided with a steered angle sensor 22 that to detects a steered angle of the steered wheels 2, a vehicle speed sensor 23 that detects a vehicle speed, and the like. Detection signals from various sensors including the sensors 20 to 23 are input to a control apparatus 24 including an electronic control unit (ECU) including a microcomputer. The control apparatus 24 sets a target steered angle based on the steering angle detected by the steering angle sensor 20 and the vehicle speed detected by the vehicle speed sensor 23. The control apparatus 24 controls and drives the steering operation actuator 4 based on a deviation between the target steered angle and the steered angle detected by the steered angle sensor 22.

During a normal operation of the vehicle, the control apparatus 24 keeps the clutch mechanism 15 in a disengaged state to mechanically disconnect the steering member 3 and the steering operation mechanism A from each other. In this state, based on the detection signals output by the steering angle sensor 20, the torque sensor 21, and the like, the control apparatus 24 controls and drives the first motor 11 so as to apply, to the steering member 3, an appropriate reaction force acting in a direction opposite to a direction in which the steering member 3 is steered. Output rotation of the first motor 11 is decelerated (amplified) by the first speed reducer 12, and the resultant rotation is transmitted to the steering member 3 via the steering shaft 10. That is, during a normal operation of the vehicle, the first motor 11 and the first speed reducer 12 function as a reaction force generating mechanism.

On the other hand, when, for example, in the event of abnormal conditions such as when an ignition of the vehicle is off and the steer-by-wire system is malfunctioning, the control apparatus 24 brings the clutch mechanism 15 into an engaged state to mechanically couple the steering member 3 and the steering operation mechanism A together. This enables the steering operation mechanism A to be directly operated using the steering member 3. A configuration is adopted in which the steering shaft 10 and the steering operation mechanism A can be mechanically coupled together via the clutch mechanism 15. This makes the steer-by-wire system mechanically fail-safe.

For example, when one of the steering operation actuator 4 and the first motor 11 malfunctions, the control apparatus 24 controls and drives the other of the steering operation actuator 4 and the first motor 11 so as to apply a steering assist force to the steering operation mechanism A based on the detection signals output by the steering angle sensor 20, the torque sensor 21, and the like. Output rotation of the first motor 11 is decelerated by the first speed reducer 12, and the resultant rotation is transmitted to the steering operation mechanism A via the output shaft 16, the intermediate shaft 17, and the pinion shaft 18. Output rotation of the steering operation actuator 4 is transmitted to the steering operation mechanism A by the motion conversion mechanism. That is, if an abnormality occurs, the first motor 11 and the first speed reducer 12 or the steering operation actuator 4 and the motion conversion mechanism function as a steering assist mechanism.

In particular, when the steering operation actuator 4 is malfunctioning, the first motor 11 and the first speed reducer 12 can be used as a steering assist mechanism when an abnormality occurs and also as a reaction force generating mechanism during a normal operation. This configuration enables a reduction in costs as compared to a configuration in which the steering assist mechanism and the reaction force generating mechanism are separately provided. The reaction force generating mechanism has not only the first motor 11 but also the first speed reducer 12, which amplifies the output from the first motor 11. Thus, a high rotary torque can be generated as a reaction force. Consequently, a reaction force of a desired magnitude can be applied to the steering member 3.

Figure 2:
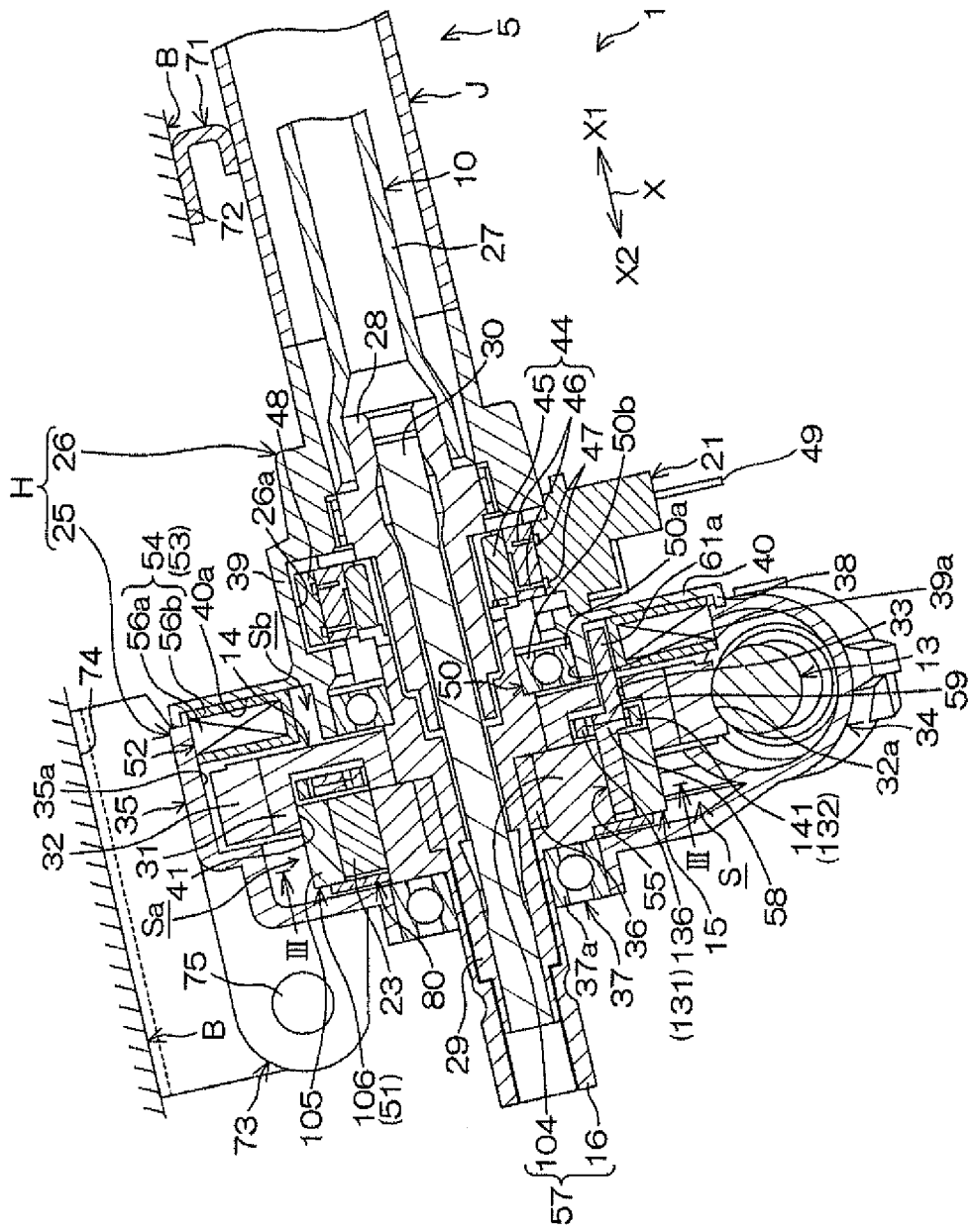
FIG. 2 is a sectional view of a housing depicted in FIG. 1.

The steering column 5 has the housing H in which at least the first speed reducer 12 is housed. The clutch mechanism 15 is housed in an internal space S (see FIG. 2) in the housing H. FIG. 2 is a sectional view of the housing H. The sectional view in FIG. 2 is taken along the section line II-II in FIG. 3 described below.

The steering shaft 10 includes a middle shaft 27, an input shaft 28, an inner shaft 29, and a torsion bar 30. The middle shaft 27 is connected to the steering member 3 (see FIG. 1). The input shaft 28 is coaxially fixed to the middle shaft 27. The torsion bar 30 couples the input shaft 28 and the inner shaft 29 together in line. When a steering torque is input to the input shaft 28 via the middle shaft 27, torsion bar 30 is elastically torsionally deformed. Consequently, the input shaft 28 and the inner shaft 29 rotate relative to each other. The steering torque is detected by the torque sensor 21 based on a rate of relative rotation between the input shaft 28 and the inner shaft 29.

The steering column 5, which supports the steering shaft 10, has a cylindrical jacket J, a sensor housing 26, and a speed reducer housing 25. The jacket J houses at least a part of the middle shaft 27. The sensor housing 26 is disposed below the steering shaft 10 with respect to the jacket J in the axial direction (on an steering operation mechanism A side)

to house at least a part of the torque sensor 21 and to hold the torque sensor 21. The speed reducer housing 25 is disposed below the steering shaft 10 with respect to the sensor housing 26 in the axial direction to house the first speed reducer 12. The sensor housing 26 and the speed reducer housing 25 are included in the housing H.

The steering column 5 is attached to a predetermined portion 72 of a vehicle body B by use of an upper attachment structure 71 disposed on a rear side of the vehicle and to a predetermined portion 74 of the vehicle body B by use of a lower attachment structure 73 disposed on a front side of the vehicle. The jacket J is supported by the upper attachment structure 71, and the speed reducer housing 25 is supported by the lower attachment structure 73. In this state, the steering shaft 10 is supported in an oblique orientation (the oblique orientation in which the steering member 3 (see FIG. 1) is positioned above) with respect to a front-rear direction of the vehicle.

The steering column 5 is supported so as to be able to swing around a tilt center shaft 75. The upper attachment structure 71 and the lower attachment structure 73 perform a tilt adjusting function to adjust a height position of the steering member 3 (see FIG. 1) by swinging and tilting the steering column 5 around the tilt center shaft 75. The lower attachment structure 73 functions as a tilt hinge mechanism.

The torque sensor 21 is shaped like a ring that surrounds the steering shaft 10 and is fitted on and supported by an inner periphery 26a of the sensor housing 26. The sensor housing 26 is fixed to the speed reducer housing 25. The sensor housing 26 includes an outer tube 38, an inner tube 39, and an annular wall 40. The outer tube 38 is in abutting contact with an upper end of the speed reducer housing 25. The inner tube 39 supports an outer ring 50a of a first bearing 50 on an inner periphery 39a of the inner tube 39. The annular wall 40 connects the outer tube 38 and the inner tube 39 together.

The torque sensor 21 detects a steering torque based on a magnetic flux generated in a magnetic-circuit forming mechanism 44 provided in connection with the input shaft 28 and the inner shaft 29. The magnetic-circuit forming mechanism 44 includes a multipolar magnet 45 and a pair of magnetic yokes 46 to form a magnetic circuit. The multipolar magnet 45 is coupled to one of the input shaft 28 and the inner shaft 29 so as to be rotatable integrally therewith. The magnetic yokes 46 are disposed in a magnetic field of the multipolar magnet 45 and coupled to the other of the input shaft 28 and the inner shaft 29 so as to be rotatable integrally therewith.

The torque sensor 21 includes a pair of magnetic force collecting rings 47, a magnetic-flux detecting element (not depicted in the drawings) such as a Hall IC, and an annular main body 48 formed of a resin and holding the magnetic force collecting rings 47a. The magnetic force collecting rings 47 are magnetically coupled to the respective magnetic yokes 46. The magnetic-flux detecting element such as a Hall IC detects a magnetic flux between magnetic force collecting portions (not depicted in the drawings) of the magnetic force collecting rings 47. The annular main body 48 is formed of a resin and holds the magnetic-flux detecting element and the magnetic force collecting rings 47. A wire 49 extends outward from the main body 48 of the torque sensor 21 in a radial direction. The sensor housing 26 supports the inner shaft 29 so that the inner shaft 29 is rotatable via the first bearing 50. The inner ring 50b of the first bearing 50 is fitted over the inner shaft 29 so as to be rotatable integrally with the inner shaft 29.

The speed reducer housing 25 is formed by a tubular worm shaft housing portion 34 and a worm wheel housing portion 35 that are formed of a single material and that cross each other. The worm shaft housing portion 34 houses and holds a worm shaft 13. The worm wheel housing portion 35 houses and holds a worm wheel 14. The worm wheel housing portion 35 is fixed to the sensor housing 26. The worm wheel 14 is coupled to an upper end of the inner shaft 29 in the axial direction so as to be rotatable integrally with the inner shaft 29 and to be immovable in the axial direction. The worm wheel 14 includes an annular core metal portion 31 and a synthetic resin member 32. The core metal portion 31 is bound to the inner shaft 29 so as to be rotatable integrally with the inner shaft 29. The synthetic resin member 32 surrounds the core metal portion 31 to form teeth 32a on an outer peripheral surface of the core metal portion 31. The core metal portion 31 is inserted into a mold when, for example, a resin is molded into the synthetic resin member 32. The core metal portion 31 and the synthetic resin member 32 are bound together so as to be rotatable integrally with each other.

The core metal portion 31 has one or more (in this embodiment, for example, three) insertion holes 33 penetrating the core metal portion 31 in a thickness direction thereof. When a plurality of the insertion holes 33 is formed, the insertion holes 33 are disposed at the same distance from a rotation center of the inner shaft 29. The insertion holes 33 are disposed at regular intervals in a circumferential direction of the worm wheel. The output shaft 16 protrudes downward (toward the steered shaft 6) from the worm wheel housing portion 35 in the axial direction. The output shaft 16 is disposed coaxially with the inner shaft 29 so as to surround an outer periphery of the inner shaft 29. A very small clearance is formed between an inner periphery of the output shaft 16 and the outer periphery of the inner shaft 29. The output shaft 16 is supported coaxially with the inner shaft 29 so as to be rotatable relative to the inner shaft 29, by a second bearing 36 provided such that the output shaft 16 is interposed between the second bearing 36 and the outer periphery of the inner shaft 29. As the second bearing 36, a plain bearing as depicted in FIG. 2 may be adopted or a rolling bearing may be adopted. The output shaft 16 is connected to the steering operation mechanism A (see FIG. 1) via the intermediate shaft 17 (see FIG. 1) and the like.

The worm wheel housing portion 35 supports the output shaft 16 via a third bearing 37 so that the output shaft 16 is rotatable. The third bearing 37 is disposed below the worm wheel 14 in the axial direction of the steering shaft 10. The output shaft 16 supports the inner shaft 29 via the third bearing 37 so that the inner shaft 29 is rotatable. An inner ring 37a of the third bearing 37 is fitted over the output shaft 16 so as to be rotatable integrally with the output shaft 16.

The internal space S in the housing H is partitioned into a first space Sa and a second space Sb by the worm wheel 14. The first space Sa is provided on a lower side with respect to the worm wheel 14 in the axial direction of the steering shaft 10. The second space Sb is provided on an upper side with respect to the worm wheel 14 in the axial direction of the steering shaft 10.

The clutch mechanism 15 includes a mechanical portion 51 and a driving portion 52. The mechanical portion 51 includes a two-way clutch 106 described below. In the present embodiment, the driving portion 52 includes an annular solenoid 54 and an actuating member 55. The solenoid 54 is a driving force generating portion 53. The actuating member 55 receives an electromagnetic force (driving force) from the driving force generating portion 53 to actuate the mechanical portion 51.

The mechanical portion 51 is housed and disposed in the first space Sa, which is a lower portion of the internal space S in the housing H. The solenoid 54 is housed and disposed in the second space Sb, which is an upper portion of the internal space S in the housing H. That is, the solenoid 54 is disposed on the opposite side of the worm wheel 14 from the mechanical portion 51 in the axial direction of the steering shaft 10. The solenoid 54 is fixed to an inner side surface 40a of the annular wall 40 of the sensor housing 26. The solenoid 54 has a coil 56a that is a wound copper wire or the like and a core 56b disposed in proximity to the coil 56a. An inner peripheral portion of the solenoid 54 functions as a push-out portion that pushes out an armature of the actuating member 55.

Figure 3:
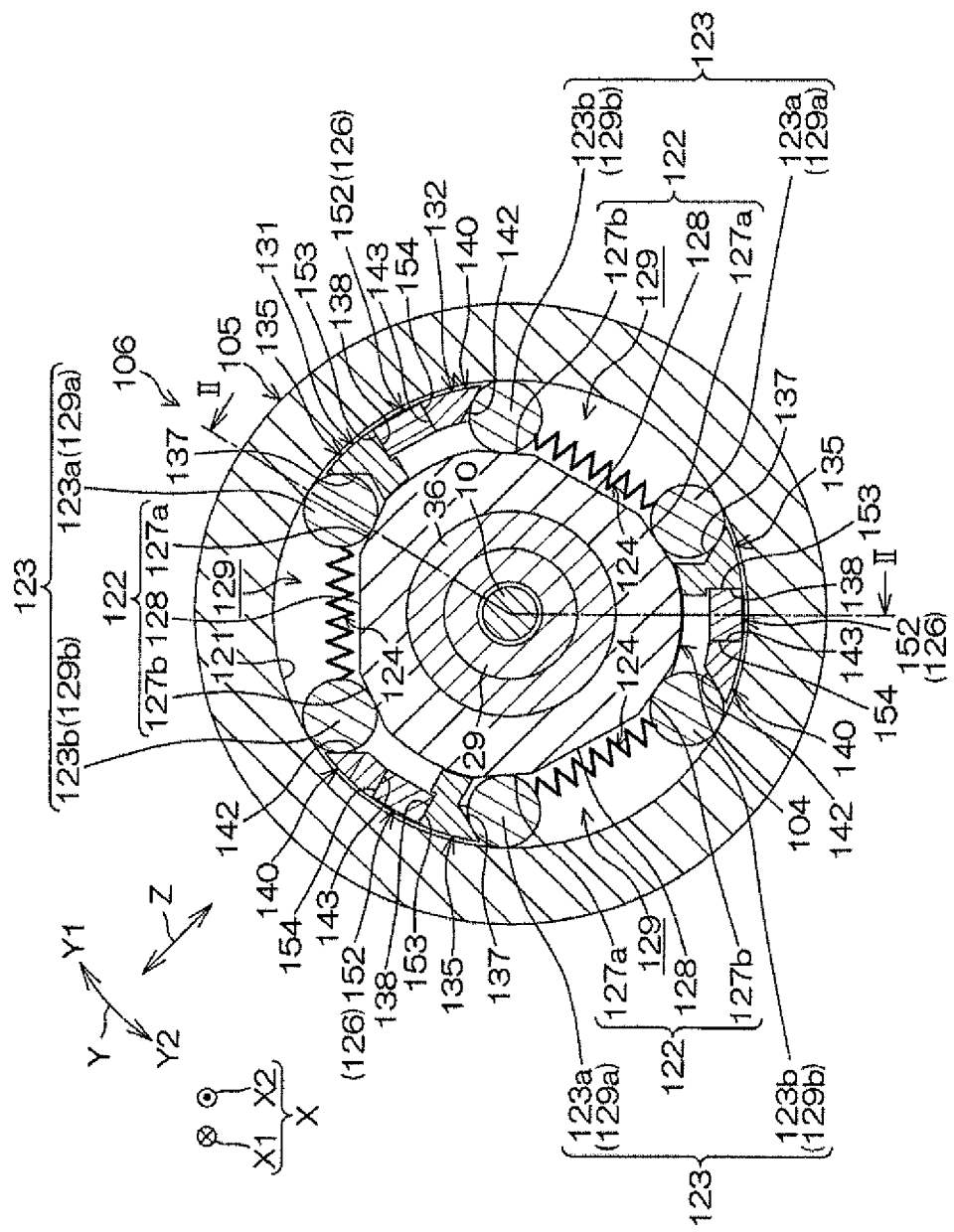
FIG. 3 is a sectional view of the housing taken along the section line III-III in FIG. 2.
Figure 4:
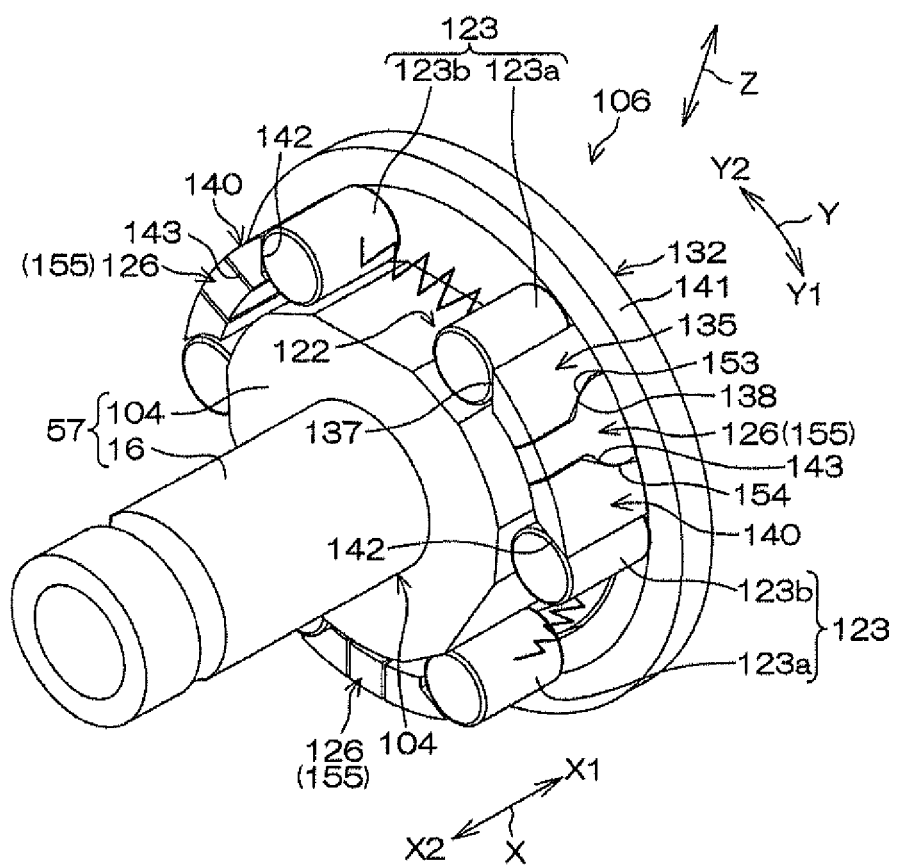
FIG. 4 is a perspective view of a two-way clutch depicted in FIG. 3.

FIG. 3 is a sectional view taken along the section line III-III in FIG. 2. FIG. 4 is a perspective view of the two-way clutch 106 depicted in FIG. 3. FIG. 4 depicts the two-way clutch 106 from which an outer ring 105 has been removed. With reference to FIGS. 2 to 4, the two-way clutch 106 will be described. The axial direction of the steering shaft 10 is hereinafter referred to as the axial direction X. The axial direction of an inner ring 104 and the axial direction of the outer ring 105 coincide with the axial direction X. Of the axial direction X, an axial direction toward a rear side of the vehicle is referred to as a first axial direction X1. Of the axial direction X, an axial direction toward a front side of the vehicle is referred to as a second axial direction X2.

A direction along a rotating direction of the steering shaft 10 is referred to as a circumferential direction Y. A circumferential direction of the inner ring 104, a circumferential direction of the outer ring 105, and the circumferential direction of the worm wheel 14 coincide with the circumferential direction Y. Of the circumferential direction Y, a circumferential direction that is a clockwise direction as viewed from a second axial direction X2 side is referred to as a first circumferential direction Y1. Of the circumferential direction Y, a circumferential direction that is a counterclockwise direction as viewed from the second axial direction X2 side is referred to as a second circumferential direction Y2. The direction of a turning radius of the steering shaft 10 is referred to as a radial direction Z. A radial direction of the inner ring 104, a radial direction of the outer ring 105, and a radial direction of the worm wheel 14 coincide with the radial direction Z.

The two-way clutch 106 includes the inner ring 104, the outer ring 105, roller pairs 123 each include a first roller 123a and a second roller 123b, and a first pressing member 131 and a second pressing member 132. The inner ring 104 is coaxially coupled to the output shaft 16 (see FIG. 2). The outer ring 105 is coaxially coupled to the inner shaft 29 (see FIG. 2) and is rotatable relative to the inner ring 104. The roller pairs 123 each include the first roller 123a and the second roller 123b are disposed in the circumferential direction Y such that each roller pair 123 is provided in a corresponding one of one or more (in this embodiment, for example, three) wedge spaces 129 formed by an outer periphery of the inner ring 104 and an inner periphery of the outer ring 105. The first and second pressing members 131 and 132 are disposed so as to be rotatable relative to each other around the steering shaft 10. The first pressing member 131 moves in the second circumferential direction Y2 to press and move the first rollers 123a of the roller pairs 123 in the second circumferential direction Y2. The second pressing member 132 moves in the first circumferential direction Y1. Consequently, the second rollers 123b of the roller pairs 123 are pressed and moved in the first circumferential direction Y1.

As depicted in FIG. 2, the outer ring 105 is fixedly fitted in an annular groove 41 formed in a lower surface of the core metal portion 31 of the worm wheel 14 that is located on the second axial direction X2 side of the core metal portion 31. Fixing the outer ring 105 to the core metal portion 31 allows the outer ring 105 to be coupled to the steering shaft 10 with a simple configuration. The outer ring 105 is formed of a metal material such as steel. The outer ring 105 is fixed by being press-fitted in the annular groove 41 in the core metal portion 31. In the present embodiment, the core metal portion 31 and the outer ring 105 are separate members due to a difference in demanded hardness between the core metal portion 31 and the outer ring 105. However, a configuration may be adopted in which the outer ring 105 is integrated with the core metal portion 31 of the worm wheel 14.

The inner ring 104 is integrated with the output shaft 16 as depicted in FIG. 2. That is, an output shaft member 57 integrally including the inner ring 104 and the output shaft 16 is provided. The output shaft member 57 is formed of a metal material, for example, steel. The inner ring 104 and the output shaft 16 may be provided using different members. As depicted in FIG. 3, each of the wedge spaces 129 is defined by a cylindrical surface 121 and a cam surface 122. The cylindrical surface 121 is formed around the inner periphery of the outer ring 105. The cam surface 122 is formed around the outer periphery of the inner ring 104 and faces the cylindrical surface 121 in the radial direction Z. Each wedge space 129 is narrower toward opposite ends thereof in the circumferential direction Y. In each wedge space 129, an elastic member 124 is disposed which elastically presses the first and second rollers 123a and 123b in the circumferential direction Y in which the first and second rollers 123a and 123b move away from each other. The elastic member 124 may be, for example, a coil spring. The cam surfaces 122 each include a pair of inclined surfaces 127a and 127b and a flat spring support surface 128. The inclined surfaces 127a and 127b incline in opposite directions in the circumferential direction Y. The spring support surface 128 is provided between the inclined surfaces 127a and 127b to connect the inclined surfaces 127a and 127b together.

Each roller pair includes the first roller 123a on a first circumferential direction Y1 side of the roller pair and the second roller 123b on the second circumferential direction Y2 side of the roller pair. The first pressing member 131 includes pillar-like first pressing portions 135 and an annular first support portion 136 (see FIG. 2). The first support portion 136 collectively supports first ends of the respective first pressing portions 135. The first support portion 136, for example, supports a plurality of the first pressing portions 135 from inside in the radial direction Z. The first pressing member 131 is provided such that the first support portion 136 is coaxial with the inner ring 104 and the outer ring 105 and is rotatable relative to the inner ring 104 and the outer ring 105. The first pressing portions 135 are identical in number (in the present embodiment, three) to the roller pairs 123 and are shaped like pillars extending in the axial direction X and disposed at regular intervals in the circumferential direction Y. The first pressing portions 135 and the first support portion 136 may be integrally formed using a synthetic resin material or a metal material. The first pressing member 131 may function as a cage that holds the roller pairs 123 and the elastic members 124.

The second pressing member 132 includes pillar-shaped second pressing portions 140 and an annular second support portion 141 (see FIG. 4). The second support portion 141 collectively supports the second pressing portions 140. The second support portion 141, for example, supports a plurality of the second pressing portions 140 from outside in the radial direction Z. The second pressing member 132 is provided such that the second support portion 141 is coaxial with the inner ring 104 and the outer ring 105 and is rotatable relative to the inner ring 104 and the outer ring 105. The second pressing portions 140 are identical in number (in the present embodiment, three) to the roller pairs 123 and are shaped like pillars extending in the axial direction X and disposed at regular intervals in the circumferential direction Y. The second pressing portions 140 and the second support portion 141 may be integrally formed using a synthetic resin material or a metal material. The second pressing member 132 may function as a cage that holds the roller pairs 123 and the elastic members 124.

As depicted in FIG. 3 and FIG. 4, the first pressing member 131 and the second pressing member 132 are combined together such that the first pressing portions 135 and the second pressing portions 140 are alternately aligned in the circumferential direction Y. As depicted in FIG. 3 and FIG. 4, between each first pressing portion 135 and a corresponding one of the second pressing portions 140 (hereinafter referred to as the "second pressing portion 140 for the adjacent roller pair 123"), one actuating portion 155 is disposed. The first pressing portion 135 can press a first roller 123a included in a corresponding one of the roller pairs 123. The second pressing portion 140 can press a second roller 123b included in another roller pair 123 that is adjacent to the corresponding roller pair 123 on the first circumferential direction Y1 side. At the second circumferential direction Y2 side of the first pressing portion 135, another second pressing portion 140 is disposed via the corresponding roller pair 123. That other second pressing portion 140 presses a second roller 123b paired with the first roller 123a that can be pressed by the first pressing portion 135. At the first circumferential direction Y1 side of the first pressing portion 135, the second pressing portion 140 for the adjacent roller pair 123 is disposed via the corresponding actuating portion 155.

As depicted in FIG. 3 and FIG. 4, on a surface of each first pressing portion 135 located on the second circumferential direction Y2 side thereof, a first pressing surface 137 is formed which is configured to press the first roller 123a of the corresponding roller pair 123. The first pressing surface 137 includes, for example, a flat surface. The first pressing surface 137 is not limited to the one including a flat surface but may come into surface contact, line contact, or point contact with the first roller 123a.

As depicted in FIG. 3 and FIG. 4, a first mating sliding contact surface 138 is formed on a surface of each first pressing portion 135 located on the first circumferential direction Y1 side thereof. A first sliding contact surface 153 is formed on a surface of each actuating portion 155 located on the second circumferential direction Y2 side thereof. The first sliding contact surface 153 and the first mating sliding contact surface 138 are shaped to come into line contact with each other. Specifically, in the present embodiment, the first mating sliding contact surface 138 includes a curved surface C that is curved so as to be recessed in the second circumferential direction Y2. The first sliding contact surface 153 includes a curved surface D that is curved so as to protrude in the second circumferential direction Y2. The curved surface C has a radius of curvature set smaller than the radius of curvature of the curved surface D. The curved surface C and the curved surface D are in line contact with each other. In other words, the first sliding contact surface 153 and the first mating sliding contact surface 138 are in line contact with each other. A position on the curved surface C where the curved surface C contacts the curved surface D moves on the curved surface C in conjunction with movement of the actuating member 55 in the axial direction X. In a normal state, the position is prevented from deviating from the curved surface C.

As depicted in FIG. 3 and FIG. 4, on a surface of each second pressing portion 140 located on the first circumferential direction Y1 side thereof, a second pressing surface 142 is formed which presses the second roller 123b of the corresponding roller pair 123. The second pressing surface 142 includes, for example, a flat surface. The second pressing surface 142 is not limited to the one including a flat surface but may come into surface contact, line contact, or point contact with the second roller 123b.

As depicted in FIG. 3 and FIG. 4, a second mating sliding contact surface 143 is formed on a surface of each second pressing portion 140 located on the second circumferential direction Y2 side thereof. A second sliding contact surface 154 is formed on a surface of each actuating portion 155 located on the second circumferential direction Y2 side thereof. The second sliding contact surface 154 and the second mating sliding contact surface 143 are shaped to come into line contact with each other. Specifically, in the present embodiment, the second mating sliding contact surface 143 includes a curved surface E that is curved so as to be recessed in the first circumferential direction Y1. The second sliding contact surface 154 includes a curved surface F that is curved so as to protrude in the first circumferential direction Y1. The curved surface E has a radius of curvature set smaller than the radius of curvature of the curved surface F. The curved surface E and the curved surface F are in line contact with each other. In other words, the second sliding contact surface 154 and the second mating sliding contact surface 143 are in line contact with each other. A position on the curved surface E where the curved surface E contacts the curved surface F moves on the curved surface E in conjunction with movement of the actuating member 55 in the axial direction X. In the normal state, the position is prevented from deviating from the curved surface E.

Figure 5:
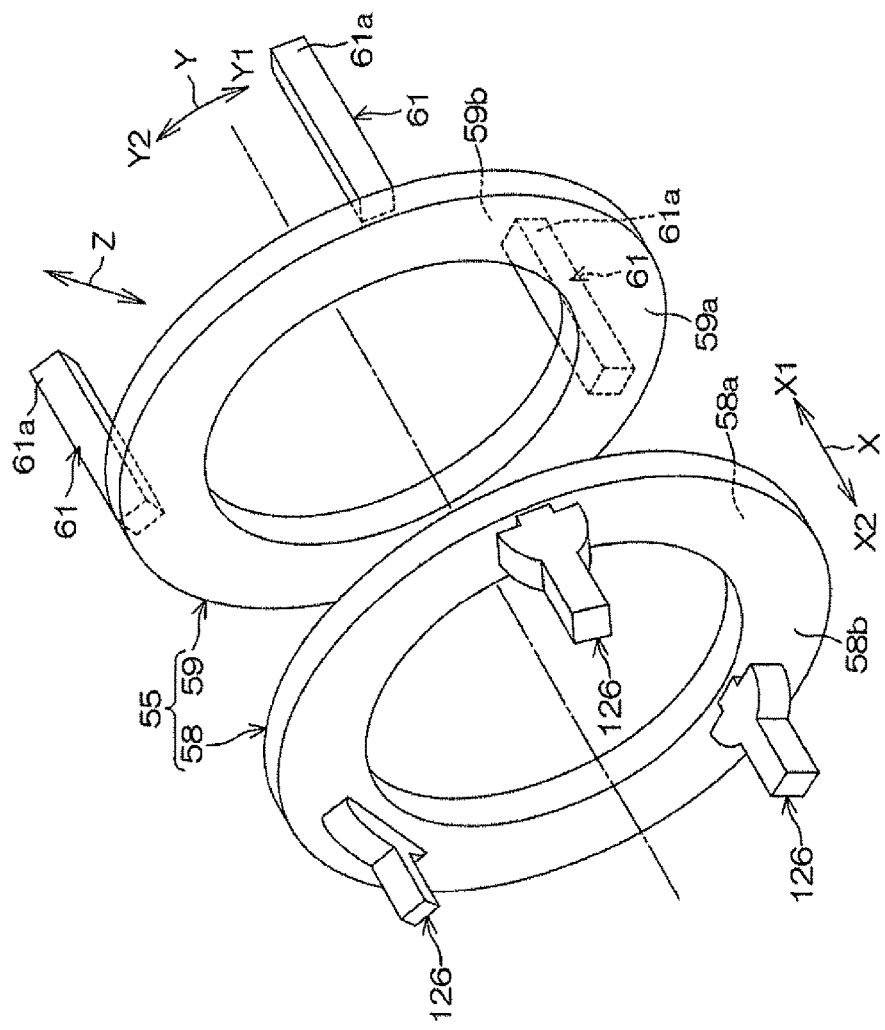
FIG. 5 is an exploded perspective view of an actuating member depicted in FIG. 4.

FIG. 5 is an exploded perspective view of the actuating member 55. The actuating member 55 includes a first circular-ring member 58 and a second circular-ring member 59. The first and second circular-ring members 58, 59 are provided coaxially with the steering shaft 10 (see FIG. 2 or any other relevant figure) and have a first facing surface 58a and a second facing surface 59a, respectively, that face each other. On a first opposite surface 58b opposite to the first facing surface 58a of the first circular-ring member 58, wedge members (first members) 126 are fixed each of which engages with the corresponding first pressing portion 135 and the corresponding second pressing portion 140 (see FIG. 3 or any other relevant figure). The wedge members 126 extend in the axial direction X and are identical in number to the roller pairs 123. As depicted in FIG. 5, the wedge members 126 may be disposed at regular intervals in the circumferential direction Y. The first circular-ring member 58 and the wedge members 126 may be formed of a resin material or a metal material.

On a second opposite surface 59b opposite to the second facing surface 59a of the second circular-ring member 59, insertion pins (extension portions or second members) 61 are fixed which are inserted through the respective insertion holes 33 in the worm wheel 14. The insertion pins 61 extend along the axial direction X. In the present embodiment, the insertion pins 61 are identical in number to the insertion holes 33. Each of the insertion pins 61 is shaped, in a section thereof orthogonal to the axis thereof, like, for example, a rectangle. In FIG. 5, the number of the insertion pins 61 is the same as the number of the wedge members 126, but this is only illustrative, and another number may be adopted.

The second circular-ring member 59 and the insertion pins 61 are formed of a metal material such as steel. The second circular-ring member 59 and the insertion pins 61 function as an armature. Distal ends 61a of the insertion pins 61 are inserted through the respective insertion holes 33 and disposed so as to face an inner periphery of the solenoid 54 (see FIG. 2 or any other relevant figure). When a current is conducted through the solenoid 54 to excite the coil 56a, the insertion pins 61 are pushed out. The actuating member 55, subjected to this push-out, moves in the second axial direction X2.

Only the insertion pins 61 may function as an armature. The whole actuating member 55 may function as an armature. The first and second circular-ring members 58, 59 are provided to be movable integrally with each other in the axial direction X and to be rotatable relative to each other around the steering shaft 10. In other words, the insertion pins 61 and the wedge members 126 are provided to be movable integrally with one another in the axial direction X and so as to be rotatable relative to one another around the steering shaft 10. For example, the first and second circular-ring members 58, 59 may be fitted together with a fitting member (not depicted in the drawings), so as to be rotatable relative to each other around the steering shaft 10. In this case, the first facing surface 58a and the second facing surface 59a may contact each other, and the first and second circular-ring members 58, 59 may be slidable relative to each other in the circumferential direction Y.

While the steer-by-wire system is in operation, the output shaft 16 rotates in conjunction with steering by the steering operation mechanism A (see FIG. 1). At this time, in conjunction with rotation of the output shaft 16, the first and second pressing members 131, 132 (see FIG. 2 or any other relevant figure) included in the two-way clutch 106 (see FIG. 2 or any other relevant figure) rotate. In this state, the two-way clutch 106 is released, and thus, the worm wheel 14 (see FIG. 2 or any other relevant figure) is prevented from rotating in conjunction with rotation of the output shaft 16. Thus, rotation of the output shaft 16 is accompanied by a variation in the relative rotating orientation between each of the first and second pressing members 131, 132 and the worm wheel 14. The actuating member 55 includes the insertion pins 61 and the wedge members 126, which are movable integrally with one another in the axial direction X and to be rotatable relative to one another around the steering shaft 10. Consequently, regardless of a variation in relative rotating orientation between each of the first and second pressing members 131, 132 and the worm wheel 14, the first and second pressing members 131, 132 can be appropriately operated using an electromagnetic force from the driving force generating portion 53 (solenoid 54).

Figure 6A:
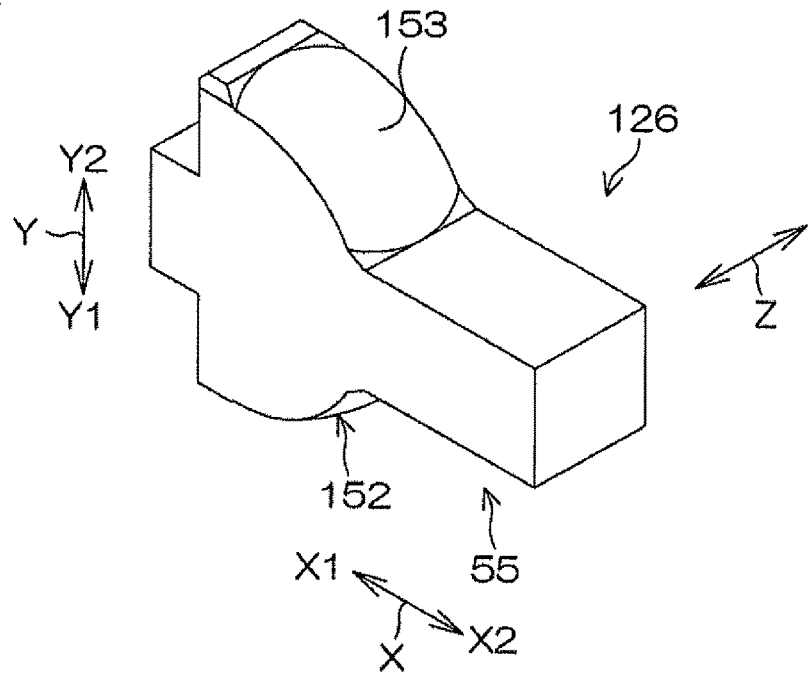
FIGS. 6A and 6B are perspective views of a wedge member of the actuating member.
Figure 6B:
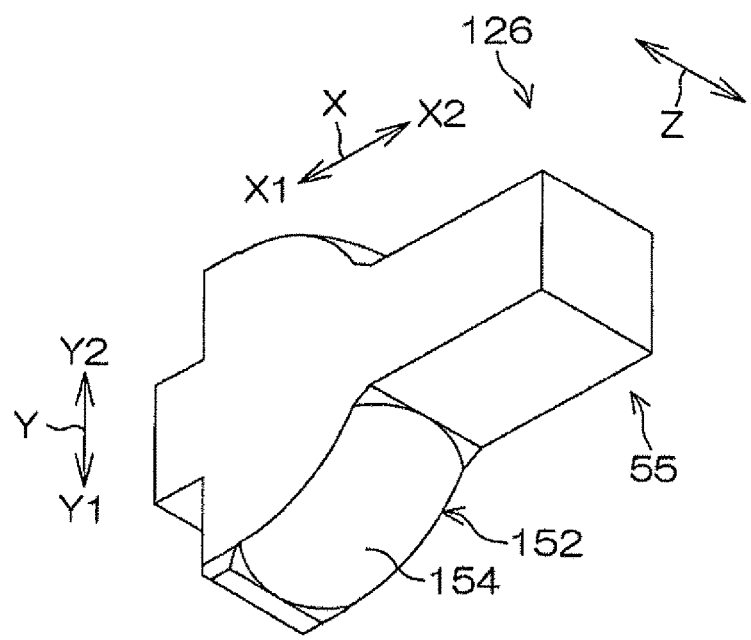

FIG. 6A and FIG. 6B are perspective views depicting a configuration of each of the wedge members 126 of the actuating member 55. In FIG. 6A and FIG. 6B, the wedge member 126 is viewed in two different directions. Each wedge member 126 includes a wedge portion 152 located in the middle of the wedge member 126 in the axial direction X thereof and spreading in the opposite directions of the circumferential direction Y. The wedge portion 152 includes the first sliding contact surface 153 formed on the second circumferential direction Y2 side of the wedge portion 152 and the second sliding contact surface 154 formed on the first circumferential direction Y1 side of the wedge portion 152. The wedge portion 152 comes into sliding contact with the first and second pressing members 131, 132 from a first axial direction X1 side. The first sliding contact surface 153 and the second sliding contact surface 154 are shaped as described above.

Figure 7:
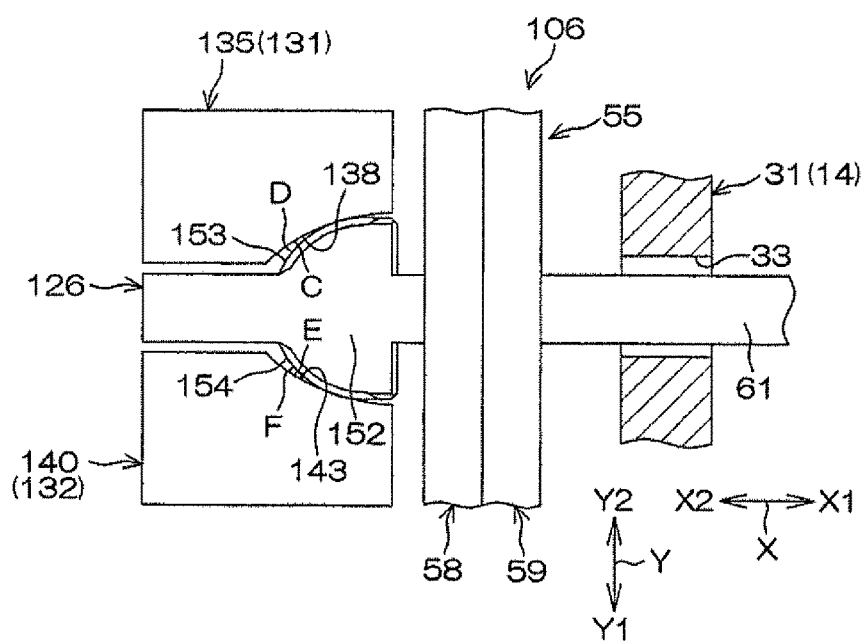
FIG. 7 is a diagram illustrating a positional relation between the actuating member and both first and second pressing members observed while the two-way clutch is engaged.
Figure 8:
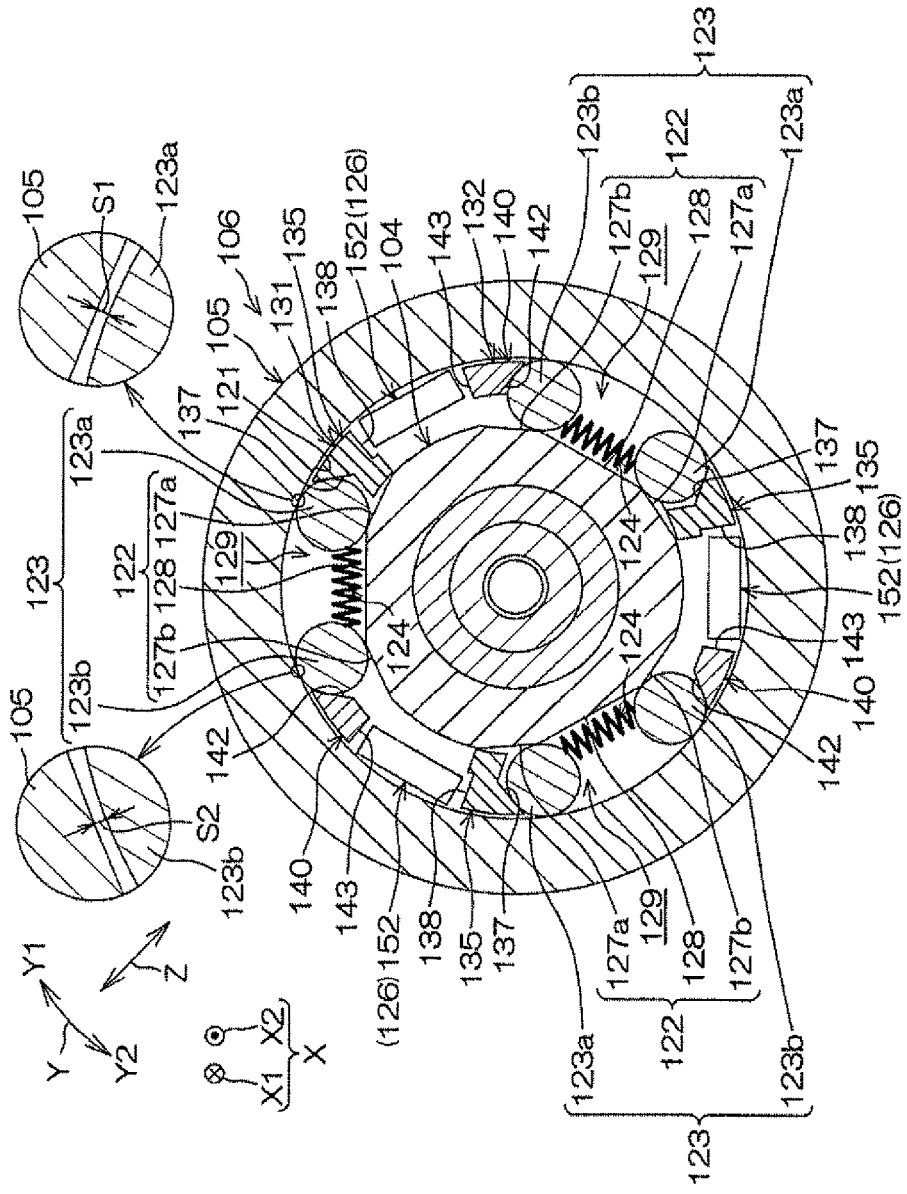
FIG. 8 is a sectional view of the two-way clutch in a released state.
Figure 9:
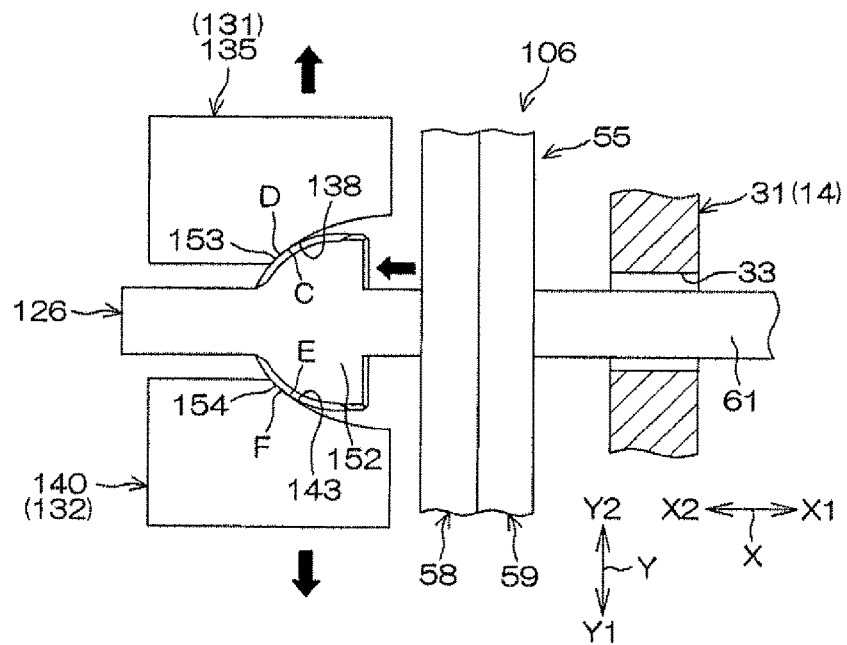
FIG. 9 is a diagram illustrating a positional relation between the actuating member and both the first and second pressing members observed while the two-way clutch is released.

FIG. 7 is a diagram illustrating a positional relation between the actuating member 55 and both the first and second pressing members 131, 132 observed while the two-way clutch 106 is engaged. FIG. 8 is a sectional view of the two-way clutch 106 in a released state. FIG. 9 is a diagram illustrating a positional relation between the actuating member 55 and both the first and second pressing members 131, 132 observed while the two-way clutch 106 is released.

With reference to FIG. 2, FIG. 3, and FIGS. 7 to 9, engagement and disengagement of the clutch mechanism 15 will be described.

To allow the clutch mechanism 15 to be engaged, power feeding to the solenoid 54 is turned off. In this state, the insertion pins 61 are not pushed out in the second axial direction X2 by the solenoid 54. Therefore, the elastic members 124 press the first pressing members 131 in the first circumferential direction Y1 via the respective first rollers 123a, while pressing the second pressing members 132 in the second circumferential direction Y2 via the respective second rollers 123b. The directions of the pressing forces and the inclinations of the first sliding contact surfaces 153 and the second sliding contact surfaces 154 act to allow the wedge members 126 to be pushed back in the first axial direction X1, while allowing the insertion pins 61 to be pushed back via the circular-ring members 58, 59. Thus, the actuating member 55 is placed in a first position (the position depicted in FIG. 7) in the axial direction X. With the actuating member 55 placed in the first position, the two-way clutch 106 is engaged. In this engaged state, as depicted in FIG. 3, each elastic member 124 elastically presses the corresponding first roller 123a toward a first engagement position 129a at an end of the corresponding wedge space 129 located on the first circumferential direction Y1 side thereof. Thus, the first rollers 123a are engaged with the outer periphery of the inner ring 104 and the inner periphery of the outer ring 105. Each elastic member 124 elastically presses the corresponding second roller 123b toward a second engagement position 129b at an end of the corresponding wedge space 129 located on the second circumferential direction Y2 side thereof. Thus, the second rollers 123b are engaged with the outer periphery of the inner ring 104 and the inner periphery of the outer ring 105. As a result, the engaged two-way clutch 106 couples the inner shaft 29 and the output shaft 16 together, in turn mechanically coupling the steering member 3 (see FIG. 1) and the steering operation mechanism A (see FIG. 1) together.

On the other hand, to allow the clutch mechanism 15 to be disengaged, the power feeding to the solenoid 54 is turned on. When the power feeding to the solenoid 54 is switched on, a force exerted by the solenoid 54 to push out the insertion pins 61 overcomes a force exerted by the elastic members 124 to push back the insertion pins 61 while the clutch is engaged as described above. As depicted in FIG. 9, the insertion pins 61 are pushed out by the solenoid 54. As a result, the first circular-ring member 58 is pushed out via the second circular-ring member 59. Consequently, the actuating member 55 is pushed out in the second axial direction X2 to move in the second axial direction X2 (for example, approximately 1 to 2 mm). Thus, the actuating member 55 is placed in a second position (the position depicted in FIG. 9) located on the second axial direction X2 side with respect to the first position (the position depicted in FIG. 7).

As described above, each first sliding contact surface 153 includes the curved surface D shaped so as to protrude in the second circumferential direction Y2 and is in line contact with the corresponding first mating sliding contact surface 138. The second sliding contact surface 154 includes the curved surface F shaped so as to protrude in the first circumferential direction Y1 and is in line contact with the corresponding second mating sliding contact surface 143. In other words, the first sliding contact surface 153 and the second sliding contact surface 154 include respective portions configured such that the portions protrude in the opposite first and second circumferential directions Y1, Y2 as they extend in the first axial direction X1. The first sliding contact surface 153 and the second sliding contact surface 154 are configured to come into line contact with the mating sliding contact surfaces 138, 148, respectively. Therefore, in conjunction with movement of the actuating member 55 toward the second position on the second axial direction X2 side, the first mating sliding contact surfaces 138, that is, the first pressing portions 135 move in the second circumferential direction Y2, whereas the second mating sliding contact surfaces 143, that is, the second pressing portions 140 move in the first circumferential direction Y1.

Consequently, the first pressing portions 135 (first pressing surfaces 137) press and move the respective first rollers 123a in the second circumferential direction Y2 against the elastic pressing forces of the respective elastic members 124. Consequently, each first roller 123a leaves the first engagement position 129a (see FIG. 3). As depicted in FIG. 8, a clearance S1 is formed between each first roller 123a and the inner periphery of the outer ring 105. That is, each first roller 123a is disengaged from the outer periphery of the inner ring 104 and from the inner periphery of the outer ring 105.

The second pressing portions 140 (second pressing surfaces 142) are moved in the first circumferential direction Y1 to press and move the respective second rollers 123b in the first circumferential direction Y1 against the elastic pressing forces of the respective elastic members 124. Consequently, each second roller 123b leaves the second engagement position 129b (see FIG. 3). As depicted in FIG. 8, a clearance S2 is formed between each second roller 123b and the inner periphery of the outer ring 105. That is, each second roller 123b is disengaged from the outer periphery of the inner ring 104 and from the inner periphery of the outer ring 105.

With the actuating member 55 placed at the second position, the two-way clutch 106 is released. In this released state, the rollers 123a and 123b are disengaged from the inner ring 104 and from the outer ring 105. The released two-way clutch 106 allows mechanical coupling between the inner shaft 29 and the output shaft 16 to be released. Consequently, the steering member 3 (see FIG. 1) and the steering operation mechanism A (see FIG. 1) are uncoupled from each other.

As depicted in FIG. 2, a ring-like seal member 80 is disposed which creates a seal between a lower surface of the outer ring 105 of the two-way clutch 106 in the axial direction (the surface closer to the steering operation mechanism A) and a lower surface of the inner ring 104 of the two-way clutch 106 in the axial direction (the surface closer to the steering operation mechanism A). The seal member 80 includes a contact seal. The wedge spaces 129 are filled with a clutch lubricant that lubricates a frictional surface of the two-way clutch 106. The clutch lubricant exhibits a very high viscosity unlike a lubricant that is contained in the worm wheel housing portion 35 and lubricates meshing portions of the worm shaft 13 and the worm wheel 14. Thus, when the clutch lubricant leaks from any of the wedge spaces 129 and reaches the meshing portions of the worm shaft 13 and the worm wheel 14, the lubrication of the meshing portions may be adversely affected. Thus, the seal member 80 is used to prevent the lubricant from flowing out from the wedge spaces 129.

The clutch mechanism 15 is assumed to be disposed between the intermediate shaft and the steering column instead of being housed and disposed in the internal space S (see FIG. 2) in the housing H (see FIG. 2). Specifically, a driving force transmission mechanism described in Japanese Patent Application Publication No. 2013-92191 (JP 2013-92191 A) is assumed to be interposed between the intermediate shaft 17 (see FIG. 1) and the steering column 5 (see FIG. 1 or any other relevant figure). In this case, the driving force transmission mechanism is a large apparatus. Thus, a housing of the driving force transmission mechanism may interfere with the lower attachment structure 73 of the steering column 5. The intermediate shaft 17 needs to be displaced downward by a distance equal to the dimension of the housing of the driving force transmission mechanism. This may cause a fluctuation in torque (angle transmission errors) due to a bend angle of a joint portion of the intermediate shaft 17.

As described above, in an embodiment of the invention, the clutch mechanism 15 is housed and disposed in the internal space S in the housing H. The clutch mechanism 15 is housed and disposed inside the housing H, which houses the first speed reducer 12 and the torque sensor 21. This makes it possible to avoid interference of the clutch mechanism 15 with peripheral members (for example, the lower attachment structure 73). Inside the housing H, the driving force generating portion 53 is disposed on the opposite side of the worm wheel 14 from the mechanical portion 51 in the axial direction X. That is, the clutch mechanism 15 is divided into the portions between which the worm wheel 14 is sandwiched. Thus, the internal space S in the housing H can be effectively utilized to dispose the clutch mechanism 15 therein. This suppresses an increase in the size of the steering system 1.

Therefore, the steering system 1 can be provided which allows the clutch mechanism 15 to be mounted in the vehicle without interfering with the peripheral members and which is restrained from being increased in size. The actuating member 55 extends to the mechanical portion 51 through the insertion holes 33 in the worm wheel 14. The actuating member 55 receives a driving force from the driving force generating portion 53 to operate the mechanical portion 51. Consequently, the mechanical portion 51 can be appropriately operated using an electromagnetic force from the driving force generating portion 53 (solenoid 54) disposed the opposite side of the worm wheel 14 from the mechanical portion 51.

The two-way clutch 106 is engaged when the roller pairs 123 engage both with the inner ring 104 and with the outer ring 105. In this engaged state, the first pressing member 131 is moved in the second circumferential direction Y2, and the second pressing member 132 is moved in the first circumferential direction Y1. Consequently, (since the first pressing member 131 and the second pressing member 132 are moved in the opposite predetermined directions) the roller pairs 123 each can be pressed and moved in the directions in which the first and second rollers 123*a*, 123*b* approach one another. Thus, the roller pairs 123 are disengaged from the inner ring 104 and from the outer ring 105, allowing the two-way clutch 106 to be released. This allows the two-way clutch 106 to provide the mechanical portion 51 that couples the steering shaft 10 and the output shaft 16 together and that releases the coupling between the steering shaft 10 and the output shaft 16.

The first and second sliding contact surfaces 153, 154 of each of the wedge portions 152 include the respective portions that protrude in the opposite first and second circumferential directions Y1, Y2 as they extend in the first axial direction X1. Thus, the actuating member 55 is moved in the first axial direction X1 to allow the first pressing member 131 to move in the second circumferential direction Y2, while allowing the second pressing member 132 to move in the first circumferential direction Y1. Consequently, the roller pairs 123 each can be pressed and moved in the directions in which the first and second rollers 123*a*, 123*b* approach one another. Therefore, the two-way clutch 106 can be appropriately switched between the engaged state and the released state.

In a steering system with no clutch mechanism mounted therein, the inner shaft 29 and the intermediate shaft 17 are connected together. In contrast, in the steering system 1, the output shaft 16 provided coaxially with the inner shaft 29 so as to be rotatable relative to the inner shaft 29 is connected to the intermediate shaft 17. This allows the coordinates of the intermediate shaft 17 in the steering system 1 (the position of the intermediate shaft 17 in the vehicle) to be made equivalent to the coordinates of the intermediate shaft in the steering system with no clutch mechanism mounted therein. This makes it possible to avoid a fluctuation in torque (angle transmission errors) caused by the bend angle of the joint portion of the intermediate shaft.

Figure 14:
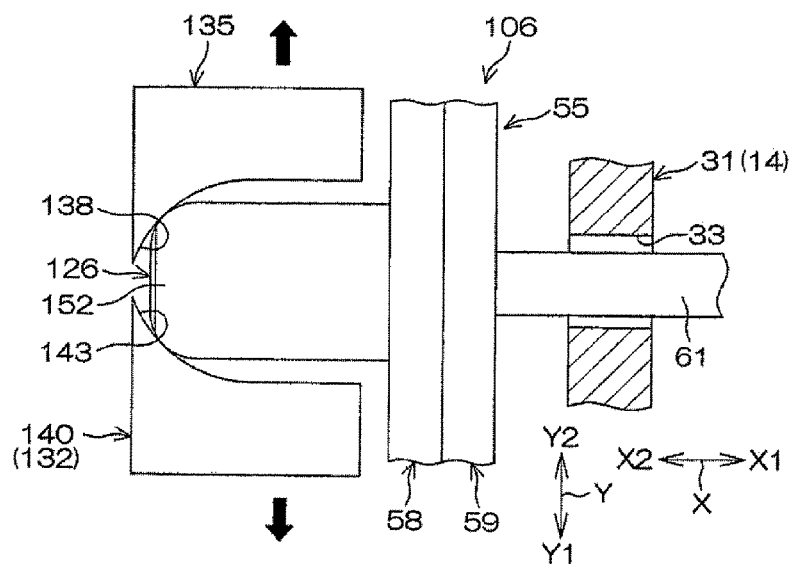
FIG. 14 is a schematic sectional view depicting a fifth variation of the steering system.
Figure 15:
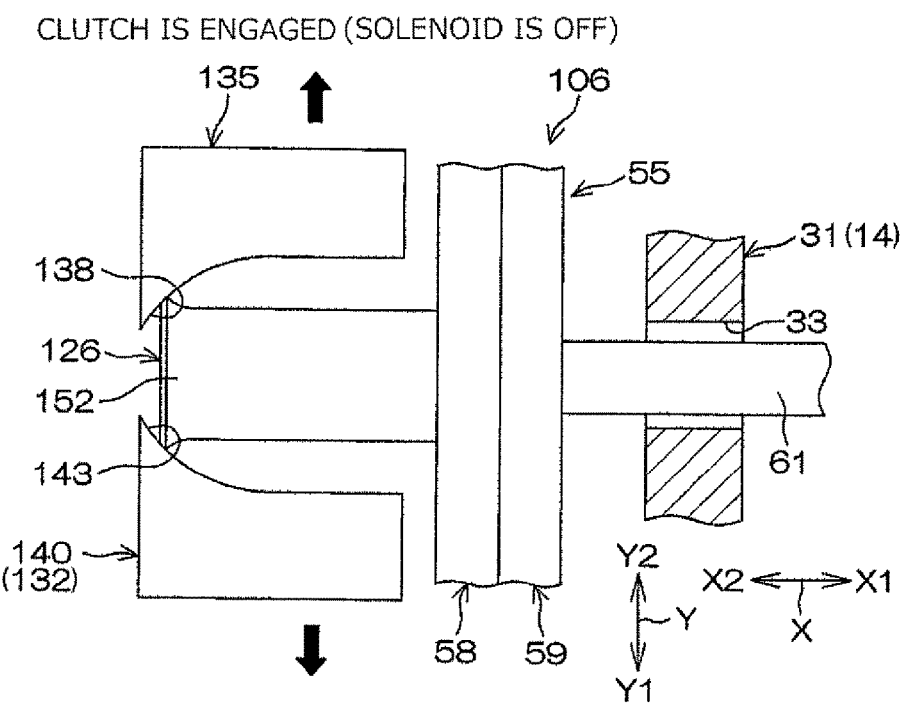
FIG. 15 is a schematic sectional view depicting a sixth variation of the steering system.

The embodiment of the invention has been described. The invention may be implemented in any other embodiment. For example, in the above-described embodiment, each of the wedge portions 152 is provided in the middle of the corresponding wedge member 126 in the axial direction X. However, the wedge portion 152 may be provided at an end of the wedge member 126 in the axial direction X as depicted in FIG. 14 and FIG. 15. In this case, manufacturing is facilitated because the wedge member 126 may be processed at the end thereof.

In the above-described embodiment, the first sliding contact surface 153, the second sliding contact surface 154, the first mating sliding contact surface 138, and the second mating sliding contact surface 143 are each formed by a surface including a curved portion. However, these surfaces may each be formed by a surface including a flat (inclined) portion. In other words, the above-described surfaces may each be formed by a combination of a flat (inclined) surface and a curved surface or exclusively by a flat (inclined) surface. One of the sliding contact surface (153, 154) and the mating sliding contact surface (138, 143) may be formed by a curved surface, and the other may be formed by a flat (inclined) surface. Alternatively, both the sliding contact surface (153, 154) and the mating sliding contact surface (138, 143) may be formed exclusively by curved surfaces or flat (inclined) surfaces.

In the above-described embodiment, the solenoid 54 is displaced from the torque sensor 21 in the axial direction X. However, the solenoid 54 and the torque sensor 21 may at least partly overlap in the axial direction X. In this case, the solenoid 54 is disposed so as to surround an outer periphery of the torque sensor 21. The solenoid 54 is housed in the sensor housing 26. In the above-described embodiment, the driving force generating portion 53 (see FIG. 2) drives the mechanical portion 51 using an electromagnetic force resulting from conduction of a current through the coil 56*a* (see FIG. 2). However, as depicted in FIG. 10, the driving force generating portion 53 may generate a driving force using oil pressure.

Figure 10:
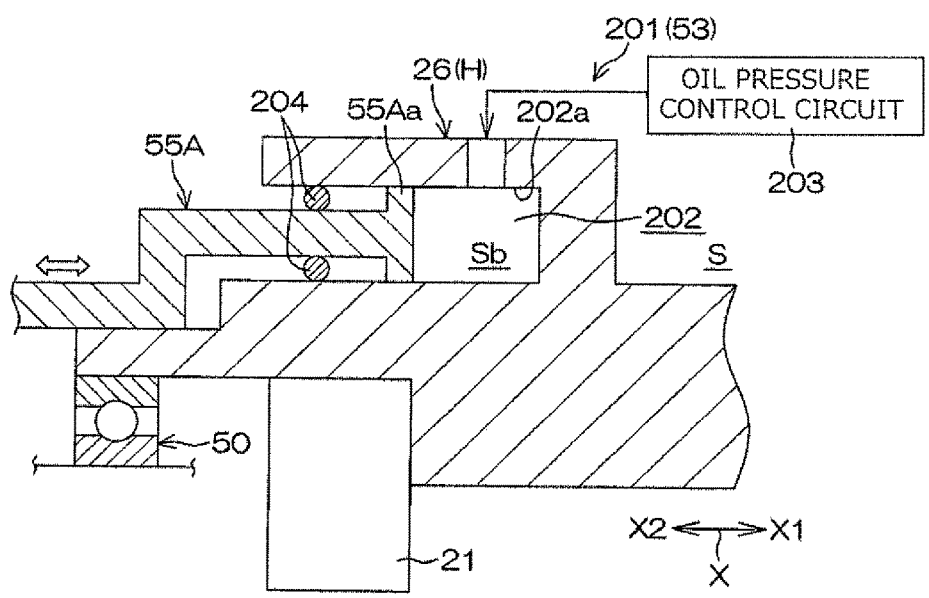
FIG. 10 is a schematic sectional view depicting a first variation of the steering system.

In a first variation depicted in FIG. 10, the driving force generating portion 53 includes an oil pressure generating portion 201. In the oil pressure generating portion 201, a part of the housing H (for example, the sensor housing 26) is sealed in a liquid tight manner to define an oil chamber 202. The driving force generating portion 53 further includes an oil pressure control circuit 203 that controls the oil pressure in the oil chamber 202. In this case, an actuating member 55A is a member extending in the axial direction X and movable in the axial direction X. The actuating member 55A and the housing H (for example, the sensor housing 26) are slidable relative to each other. An end 55Aa of the actuating member 55A located on the first axial direction X1 side thereof is fitted in the oil chamber 202. A circular-ring-shaped seal 204 creates a seal between a peripheral surface 202*a* of the oil chamber 202 and the actuating member 55A.

The oil pressure generating portion 201 is housed and disposed in a second space Sb that is an upper portion of the internal space S in the housing H. That is, the oil pressure generating portion 201 is disposed on the opposite side of the worm wheel 14 (see FIG. 2) from the mechanical portion 51 (see FIG. 2) in the axial direction X. Control by the oil pressure control circuit 203 allows oil pressure to be applied to the actuating member 55A via the oil chamber 202. The applied pressure allows the actuating member 55A to move in the axial direction X. Movement of the actuating member 55A in the axial direction X switches the clutch mechanism 15 (see FIG. 2 or any other relevant figure) between the engaged state and the released state.

Although not depicted in FIG. 10, the actuating member 55A includes, on the second axial direction X2 side thereof, a first circular-ring member (corresponding to the first circular-ring member 58) and a second circular-ring member (corresponding to the second circular-ring member 59) as is the case with the above-described embodiment. The first circular-ring member is movable integrally with the second circular-ring member in the axial direction X and rotatable relative to the second circular-ring member around the steering shaft 10. In the first variation, the oil pressure generating portion 201 is used as the driving force generating portion 53. As compared to a configuration in which the solenoid 54 (see FIG. 2) is adopted as the driving force generating portion 53, the configuration in the first variation allows avoiding the adverse effect of electromagnetic fields on the torque sensor 21 and the first bearing 50.

Figure 11:
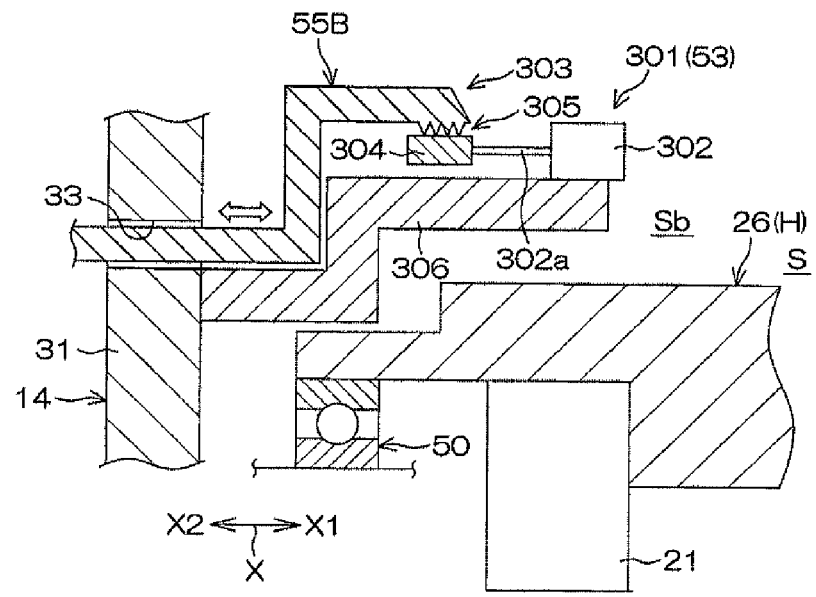
FIG. 11 is a schematic sectional view depicting a second variation of the steering system.

As depicted in FIG. 11, the driving force generating portion 53 may generate a driving force using an output from a motor. In a second variation depicted in FIG. 11, the driving force generating portion 53 includes an electric driving portion 301. An actuating member 55B is a member extending in the axial direction X and movable in the axial direction X. The electric driving portion 301 includes a second motor 302 and a second speed reducer 303 that decelerates output rotation of the second motor 302. The second speed reducer 303 includes a drive gear 304 and a driven gear 305. The drive gear 304 is formed on an output shaft 302*a* of the second motor 302. The driven gear 305 is formed on the actuating member 55B so as to be rotatable integrally with the actuating member 55B and meshes with the drive gear 304. The second motor 302 is provided on the core metal portion 31 of the worm wheel 14 via a base 306 so as to be rotatable integrally with the core metal portion 31.

The second speed reducer 303 amplifies the output rotation of the second motor 302 and converts the output rotation into a driving force of the actuating member 55B in the axial direction X. The drive gear 304 may be, for example, pinion teeth. The driven gear 305 may be, for example, rack teeth aligned along the axial direction X. The electric driving portion 301 is housed and disposed in the second space Sb that is an upper portion of the internal space S in the housing H. That is, the electric driving portion 301 is disposed on the opposite side of the worm wheel 14 from the mechanical portion 51 (see FIG. 2) in the axial direction X.

Rotational driving performed by the second motor 302 moves the actuating member 55B in the axial direction X. Movement of the actuating member 55B in the axial direction X switches the clutch mechanism 15 (see FIG. 2 or any other relevant figure) between the engaged state and the released state. In the second variation, the electric driving portion 301 is used as the driving force generating portion 53. Thus, as compared to a configuration in which the solenoid 54 (see FIG. 2 or any other relevant figure) is adopted as the driving force generating portion 53, the configuration in the second variation allows avoiding the adverse effect of electromagnetic fields on the torque sensor 21 and the first bearing 50.

Figure 12:
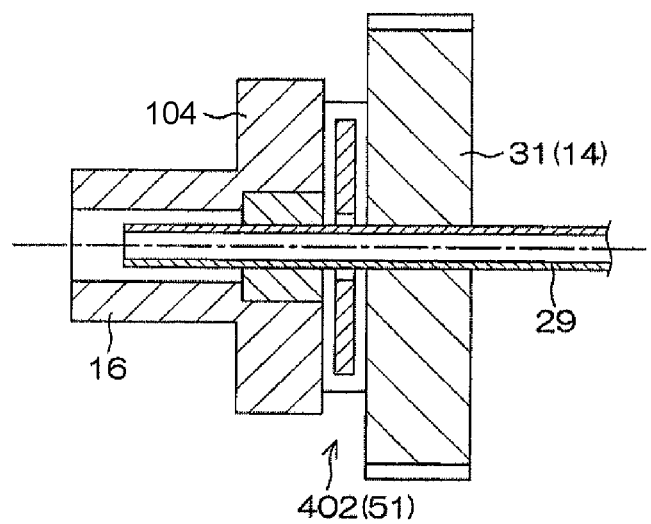
FIG. 12 is a schematic sectional view depicting a third variation of the steering system.

While the power feeding to the second motor 302 is stopped, the output shaft 302a does not rotate. Consequently, the clutch mechanism 15 (see FIG. 2 or any other relevant figure) can be kept engaged or released without using energy (electric power). As described above, the mechanical portion 51 is the two-way clutch 106 (see FIG. 3 or any other relevant figure). However, the mechanical portion 51 may be configured to include a friction clutch 402 as depicted in FIG. 12. Although FIG. 12 illustrates that a single disc clutch is used as the friction clutch 402, any other clutch such as a multi-disc clutch may be adopted.

Figure 13:
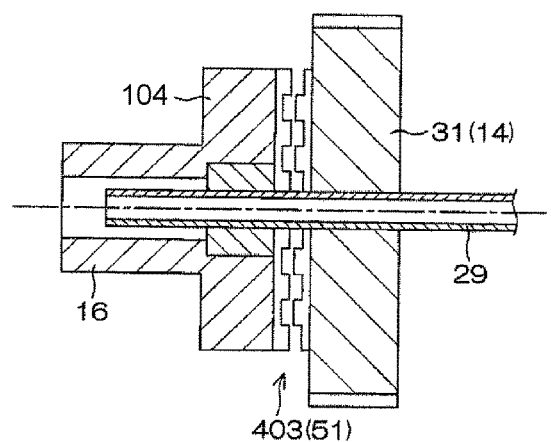
FIG. 13 is a schematic sectional view depicting a fourth variation of the steering system.

The mechanical portion 51 may be configured to include a positive clutch 403 as depicted in FIG. 13.

As described above, the inner ring 104 is coupled to the output shaft 16, and the outer ring 105 is coupled to the inner shaft 29 (steering shaft 10). However, the inner ring 104 may be coupled to the inner shaft 29 (steering shaft 10), and the outer ring 105 may be coupled to the output shaft 16.

As described above, the sensor housing 26 and the speed reducer housing 25 are included in the housing H. However, the housing H may be optionally configured so long as the housing H includes at least the speed reducer housing 25. That is, the housing H need not house the torque sensor 21 so long as the housing H houses the first speed reducer 12. Therefore, the invention is applicable to a steering system with no torque sensor.

By way of example, the worm wheel 14 is used as the gear that is attached to the steering shaft 10 so as to be rotatable integrally with the steering shaft 10. However, as this gear, any other type of gear may be adopted.

Various other modifications may be made to the invention within the scope of the claims.

What is claimed is:

1. A steering system comprising:
   a steering shaft to which a steering member is coupled;
   a worm shaft rotationally driven by a first motor;
   a worm wheel that meshes with the worm shaft and that is fixed to the steering shaft so as to be rotatable integrally with the steering shaft;
   a housing that houses at least the worm wheel;
   an output shaft that is rotatable relative to the steering shaft and coupled to a steering operation mechanism; and
   a clutch mechanism having a mechanical portion provided to enable the steering shaft and the output shaft to be coupled together and uncoupled from each other, and a driving force generating portion that generates a driving force allowing the mechanical portion to couple the steering shaft and the output shaft together and to uncouple the steering shaft and the output shaft from each other, the clutch mechanism enabling and disabling transmission of power between the steering shaft and the output shaft, wherein
   the clutch mechanism is housed and disposed in an internal space in the housing, and
   in the internal space, the driving force generating portion is disposed on an opposite side of the worm wheel from the mechanical portion in an axial direction of the steering shaft.

2. The steering system according to claim 1, wherein the worm wheel has an insertion hole that penetrates the worm wheel in a thickness direction thereof,
   the clutch mechanism further has an actuating member that receives a driving force from the driving force generating portion to actuate the mechanical portion, and
   the actuating member has an extension portion that extends to the mechanical portion through the insertion hole.

3. The steering system according to claim 2, wherein
   the actuating member includes a first member that actuates the mechanical portion and a second member that is different from the first member and that has the extension portion extending to the mechanical portion through the insertion hole, and
   the first and second members are movable integrally with each other in the axial direction of the steering shaft and rotatable relative to each other around the steering shaft.

4. The steering system according to claim 1, wherein
   the mechanical portion includes a two-way clutch, and the two-way clutch includes:
   an inner ring coaxially coupled to one of the steering shaft and the output shaft;
   an outer ring coaxially coupled to other of the steering shaft and the output shaft, and rotatable relative to the inner ring;
   a roller pair having rollers that are disposed in a circumferential direction of the inner ring in a wedge space formed by an outer periphery of the inner ring and an inner periphery of the outer ring; and
   a pair of pressing portions, the pressing portions being rotatable relative to each other around the steering shaft and moved in opposite predetermined directions to press the rollers of the roller pair in directions such that the rollers approach one another.

5. The steering system according to claim 4, wherein
   the clutch mechanism further has an actuating member allowing the mechanical portion to be actuated by receiving a driving force from the driving force generating portion, and
   the actuating member is movable in the axial direction of the steering shaft such that the movement in the axial direction moves the pair of pressing portions in opposite directions.

6. The steering system according to claim 5, wherein the pair of pressing portions includes a first pressing portion and a second pressing portion, the actuating member includes a first sliding contact surface that comes into sliding contact with the first pressing portion and a second sliding contact surface that comes into sliding contact with the second pressing portion, and the first and second sliding contact surfaces include respective portions that protrude in opposite circumferential directions as they extend in a predetermined axial direction of the steering shaft.

7. The steering system according to claim 5, wherein the driving force generating portion drives the mechanical portion using an electromagnetic force resulting from conduction of a current through a coil.

8. The steering system according to claim 4, wherein the inner ring is coupled to the output shaft, and the outer ring is coupled to the steering shaft, and the outer ring is fixed to the worm wheel.

9. The steering system according to claim 1, wherein the mechanical portion includes a friction clutch.

10. The steering system according to claim 1, wherein the mechanical portion includes a positive clutch.

11. The steering system according to claim 1, wherein the driving force generating portion drives the mechanical portion using an electromagnetic force resulting from conduction of a current through a coil.

12. The steering system according to claim 1, wherein the driving force generating portion drives the mechanical portion using oil pressure.

13. The steering system according to claim 1, including a seal member that seals an interior of the mechanical portion.

* * * * *